United States Patent [19]

Krepela

[11] Patent Number: 5,203,536
[45] Date of Patent: Apr. 20, 1993

[54] COMPACT ENGINE SHUTDOWN VALVE

[75] Inventor: Joseph Krepela, Edmonton, Canada

[73] Assignee: Barber Industries Ltd., Calgary, Canada

[21] Appl. No.: 846,630

[22] Filed: Mar. 5, 1992

[30] Foreign Application Priority Data

Jan. 20, 1992 [CA] Canada .................. 2059696

[51] Int. Cl.5 ............................................. F16K 31/44
[52] U.S. Cl. ..................... 251/74; 251/302; 251/367; 123/394
[58] Field of Search ............... 251/66, 74, 302, 367; 123/394

[56] References Cited

U.S. PATENT DOCUMENTS

| | | | |
|---|---|---|---|
| 4,215,845 | 8/1980 | Sturgeon | 251/63 |
| 4,285,494 | 8/1981 | Sturgeon | 251/63 |
| 4,381,100 | 4/1983 | Schoenberg | 251/302 |
| 4,422,418 | 12/1983 | Dorn | 123/198 D |
| 4,537,386 | 8/1985 | Krepela et al. | 251/74 |

FOREIGN PATENT DOCUMENTS 759785  8/1980  U.S.S.R. ................. 251/302

Primary Examiner—A. Michael Chambers
Attorney, Agent, or Firm—John Russell Uren

[57] ABSTRACT

An engine shutdown valve comprises a housing and a gate movable within a housing between a first position where the air flow through the shutdown valve is substantially unrestricted to a second position where the opening is restricted thereby stopping air flow. The gate is pivotable about an axis and a drive is located concentrically about the axis to rotate with the gate. The drive has a recess which is engageable by a piston movable between a first position where the gate is held in its latched position and a second position out of engagement with the recess so as to allow the gate to move to a position where the air passageway is closed. The piston assembly is located substantially wholly within the housing with only the piston of the piston assembly extending therefrom. The housing is divided into two halves joined together with cap screws having axes transverse to the axis of rotation of the gate.

10 Claims, 1 Drawing Sheet

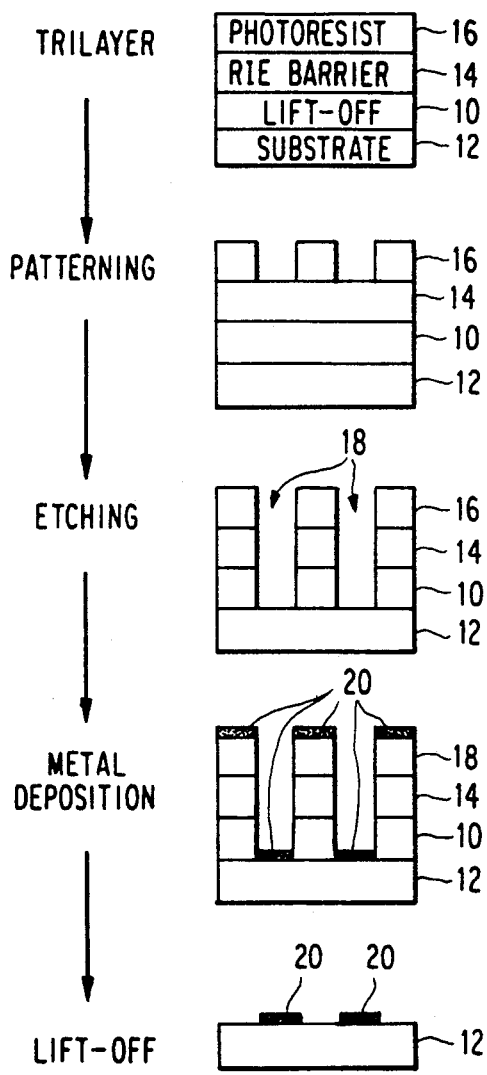
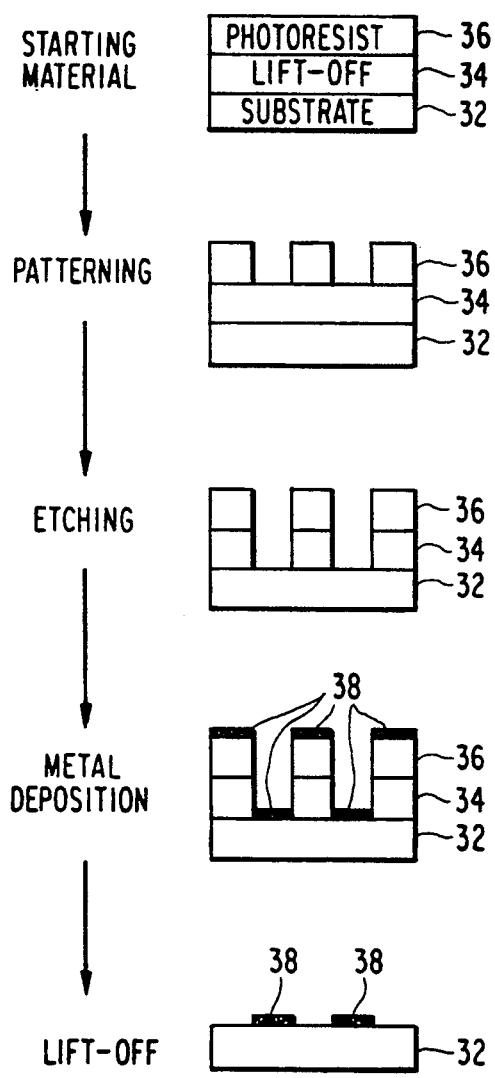

COMPACT ENGINE SHUTDOWN VALVE

INTRODUCTION

This invention relates to an engine shutdown valve, one particularly, to an engine shutdown valve of a compact configuration.

BACKGROUND OF THE INVENTION

Engine shutdown valves are, of course, well known in the industry. Such engine shutdown valves are used to terminate operation of a diesel engine when overrevving results from combustible vapours being present in the atmosphere in which such engines are operated. By terminating atmospheric or air flow through the intake manifold in which such combustible vapours are present, the engine will starve from lack of oxygen and the engine will shutdown thereby preventing damage to the engine caused by overrunning. Such engine shutdown valves are, for example disclosed in our U.S. Pat. Nos. 4,215,845, 4,285,494 and 4,537,386.

Engine shutdown valves can be manufactured in various configurations for particularly uses. For example, an engine shutdown valve disclosed in our copending U.S. application Ser. No. 07/725,290 is intended to be used within an air cleaner on a diesel engine. Other engine shutdown valves are designed for other particular uses.

Such engine shutdown valves, however, have a configuration which may be too large for many applications. Likewise, such valves have manufacturing costs which may be considerably greater than necessary.

SUMMARY OF THE INVENTION

According to one aspect of the invention, there is provided an engine shutdown valve comprising a housing, a gate within said housing and pivotable about an axis, an air flow passage extending through said housing and being parallel to said axis of said gate, a first spring acting between said gate and said housing to bias and move said gate from a first position wherein said air passage is substantially unobstructed to a second position wherein said passage is closed, a drive operably connected to said gate, and a piston assembly having a piston acting on said drive, said piston having a first retaining position in said drive to retain said gate when said gate is in said first position and a second position out of engagement with said drive when said gate is in said second position so as to release said gate from said first position.

BRIEF DESCRIPTION OF THE SEVERAL VIEWS OF THE DRAWINGS

An embodiment of the invention will now be described by way of example only, with the use of drawings in which.

DESCRIPTION OF SPECIFIC EMBODIMENT

Figure 1:
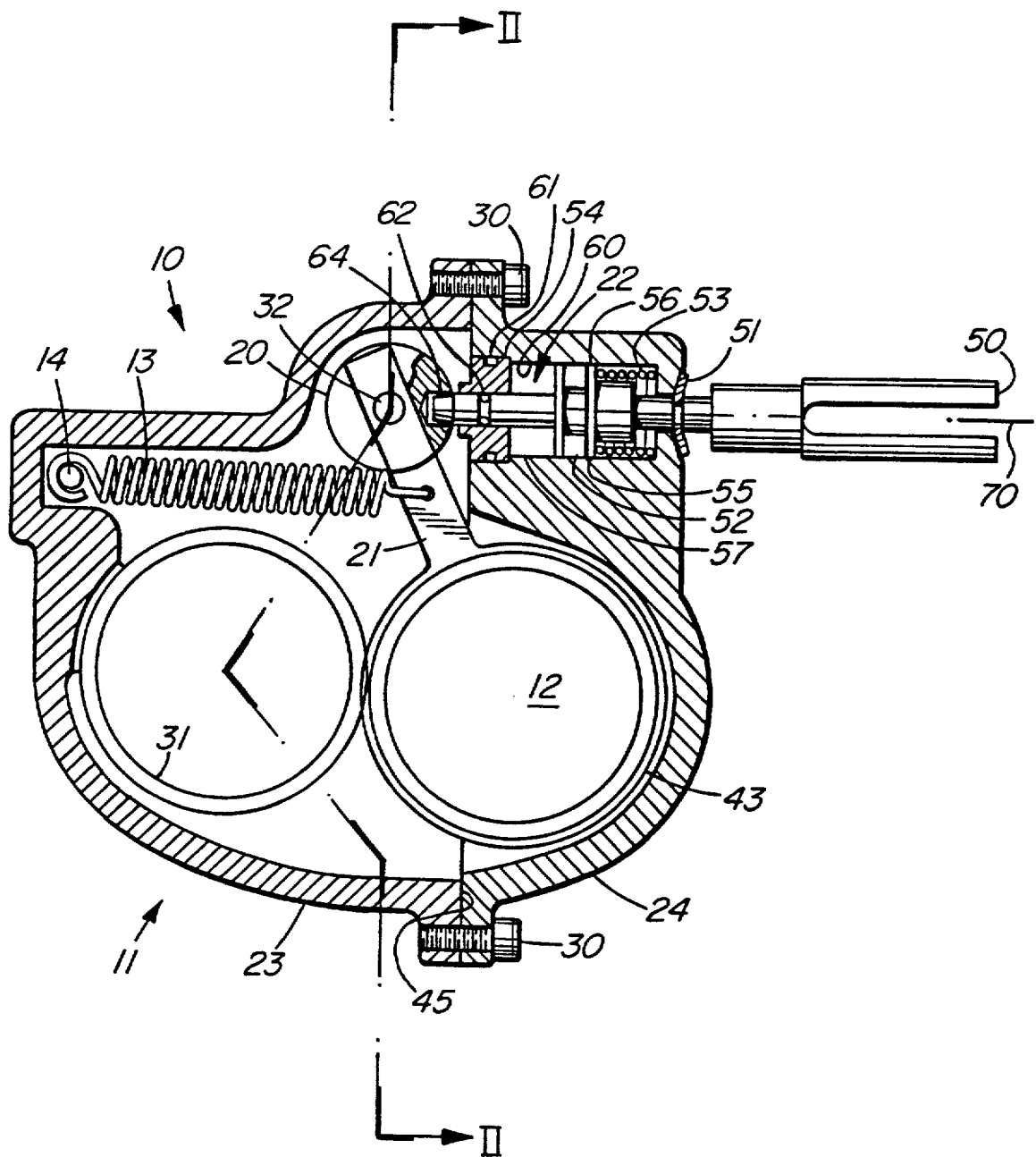
FIG. 1 is a sectional side view of the engine shutdown valve according to the invention.

Referring now to the drawings, an engine shutdown valve according to the invention is generally shown at 10 in FIG. 1. The engine shutdown valve 10 comprises a housing generally shown at 11, a gate generally shown at 12, a gate spring 13 connected between a spring anchor 14 located in housing 11 and the gate 12, a drive 20 which has a recess for the arm 21 of the gate 12 and a piston assembly generally shown at 22.

The housing 11 comprises two halves 23, 24, the halves being connected together with cap screws 30. Housing half 23 has an unobstructed passageway 31 extending therethrough, the axis of which is parallel with the axis 32 about which gate 12 pivots. Housing half 24 includes the recess for the gate in a first position where the passageway 31 is unobstructed and where the gate 12 assumes its "latched" position.

Figure 2:
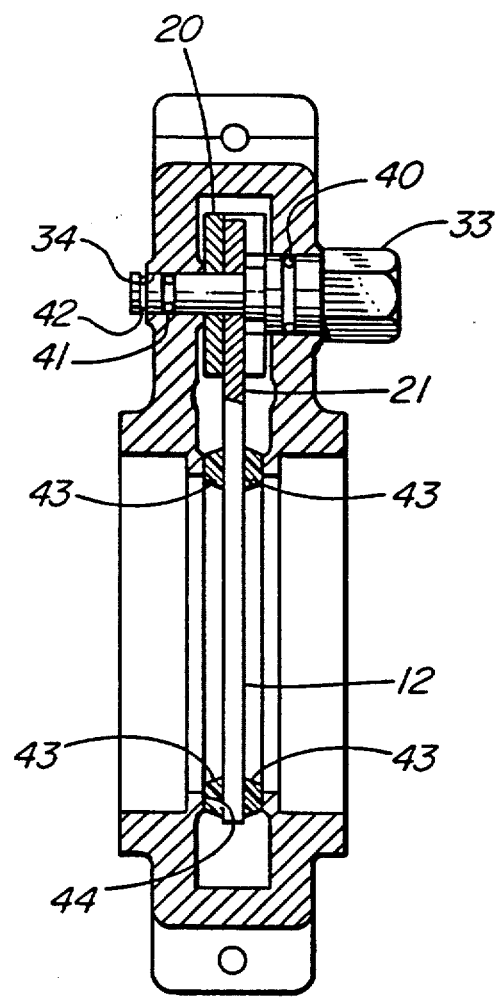
FIG. 2 is an end sectional view of the engine shutdown valve of FIG. 1 taken along II—II of FIG. 1.

The drive 20 and the arm 21 of gate 12 are held in place about pivot axis 32 by an operating shaft 33 (FIG. 2). Operating shaft 33 extends through an opening in the rear of housing half 23, through support arm 21 of gate 12 and drive 20 and out an opening 34 of smaller diameter in the forward face of housing half 23. Operating shaft 33 has a milled flat portion thereon which engages with a complementary parallel slot on drive 20. As described, drive 20 has a recess into which support arm 21 fits so as to rotate with drive 20 and operating shaft 33. A first O-ring 40 is positioned about operating shaft 33 in housing half 23 and a second O-ring 41 is positioned about operating shaft 33 in the forward opening 34 in housing half 23 as illustrated in FIG. 2. A snap ring 42 is connected to operating shaft 33 to retain it within the housing half 23 and to allow rotation of the operating shaft 33 within housing half 23.

Gate 12 has a vulcanized rubber seal mounted on opposite sides of the gate 12. In the closed position, the vulcanized rubber seal 43 contacts the machined edges 44 of housing half 23 as illustrated in FIG. 2. In the open or latched position, the gate 12 is a loose fit within the right housing 24.

Referring to the piston assembly 22, a clevis yoke assembly 50 is mounted to the end of the piston 55 as illustrated in FIG. 1. A dust seal 51 extends about the piston 55 of the piston assembly 22 adjacent the outside of housing half 24. A U-cup 52 is mounted about the piston 55 and a compression spring 53 is mounted between the piston right shoulder 56 and the inside of the housing half 24 to exert pressure on the piston assembly 22 and thereby bias it into the drive 20 or leftwardly as viewed in FIG. 1. A guide 54 is mounted in the piston assembly recess 60 and an O-ring 61 extends between the guide 54 and the housing half 24. A further O-ring 62 is mounted between the inside of guide 54 and the outside of the spindle portion 57 of the piston assembly 22. The spindle portion 57 of the piston assembly 22 has a tapered head portion 64 which is complementary to the recess in drive 20. Piston assembly 22 is reciprocal along axis 70 so as to move in and out of the recess in drive 20 as will be explained in greater detail hereafter.

When the two housings 23, 24 are assembled, the piston assembly 22 and guide 54 are held in right housing 24 by left housing 23. The housings 23, 24 are cast and the machined areas include the join line 45 between the housing holes 23, 24, the holes for the operating shaft 33 in the left housing half 23, the bores for accepting the piston assembly 22 and guide ring 54 in right housing 24, the contact face of housing 24 for dust seal 51 and the bore for the piston 55 which extends through housing 24 to clevis yoke assembly 50.

Operation

In operation, the engine shutdown valve 10 is installed in the intake manifold of a diesel engine (not shown) with the unobstructed passageway being positioned so as to be coaxial with the intake manifold. Operating shaft 33 may be rotated manually and drive 20 and support arm 12 connected thereto will rotate as operating shaft 33 is rotated until the piston assembly 22, being under the influence of compression spring 53 acting leftwardly as viewed in FIG. 1, enters the recess in drive 20 and thereby retains the gate 12 in the first latched position as illustrated in FIG. 1 leaving the passageway 31 unobstructed. Spring 13 will bias the gate 12 leftwardly or towards its second position where the passageway 31 is totally obstructed as illustrated in FIG. 2.

When an overrunning condition is noticed and when the engine operation wishes to be terminated by an operator, the clevis yoke assembly 50 which may be connected to a lever movable by the operator, is moved rightwardly as viewed in FIG. 1. The piston 22 will thereby move out of the recess in drive 20 with the result that the gate 12 and the support arm 21 will immediately rotate clockwise about axis 32 under the influence of spring 13 to the second or tripped position where the passageway 31 is wholly obstructed. This will terminate air flow through the engine and the engine will then shutdown. When the condition that gave rise to the overrunning condition is corrected, the operating shaft 33 is manually, rotated to open the gate 12 as earlier described and the engine shutdown valve is again ready for operation.

While in the particular embodiment described, the operation of the engine shutdown valve 10 is accomplished manually by the operator, it is, of course, contemplated that such operation could be automatic whereby the overrunning condition of the engine is sensed by a transducer which, in turn, sends a signal to a solenoid or other operating device which will then move the piston assembly 22 rightwardly out of engagement with the recess in drive 20 thereby allowing the gate 12 to rotate clockwise and close passageway 31 under the influence of spring 13.

Many further embodiments of the invention will readily occur to those skilled in the art to which the invention relates and the specific embodiment described should be taken as illustrative of the invention only and not as restricting its scope as defined in accordance with the accompanying claims.

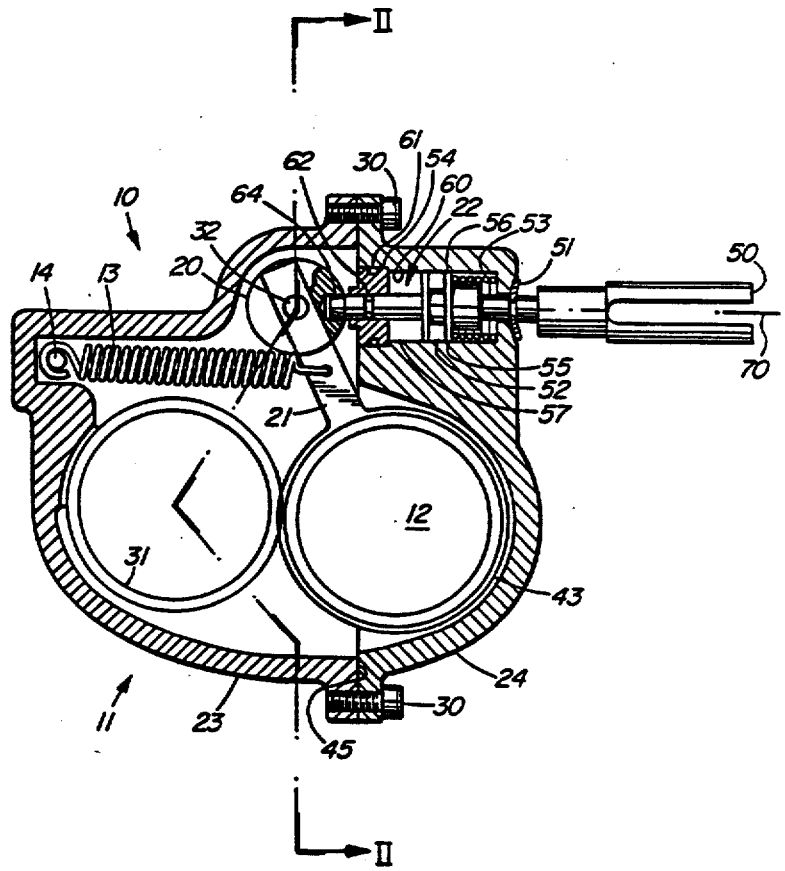

What is claimed is:

1. An engine shutdown valve comprising a housing, a gate within said housing and being pivotable about an axis, an air flow passage extending through said housing and having a longitudinal axis parallel to said axis of said gate, a first spring acting between said gate and said housing to bias and move said gate from a first position wherein said air passage is substantially unobstructed to a second position wherein said passage is closed, a drive operably connected to said gate, and a piston assembly having a piston acting on said drive, said piston having a first retaining position in said drive to retain said gate when said gate is in said first position and a second position out of engagement with said drive when said gate is in said second position so as to release said gate from said first position, said housing being made from two assemblies, said assemblies being joined together in a plane which is transverse to the plane of movement of said gate.

2. An engine shutdown valve as in claim 1 wherein said piston of said piston assembly is supported wholly within one of said housing assemblies.

3. An engine shutdown valve as in claim 2 wherein said gate further comprises a support arm rotatable about said axis, said spring acting between said support arm and one of said housing assemblies.

4. An engine shutdown valve as in claim 3 wherein said one of said housing assemblies is the opposite assembly from said assembly supporting said piston of said piston assembly.

5. An engine shutdown valve as in claim 1 wherein said drive is rotatable with said gate about said axis and said piston moves between a first position wherein a recess in said drive is engaged by said piston and a second position wherein said recess in said drive is vacated by said piston.

6. An engine shutdown valve as in claim 5 wherein the axis of said piston extends through the axis of rotation of said gate and drive.

7. An engine shutdown valve as in claim 6 wherein said piston is biased towards said recess by a second spring operably acting between said housing and said piston.

8. An engine shutdown valve as in claim 6 wherein said piston extends from said housing and further comprising a means for moving said piston from said first position to said second position against the bias of said second spring.

9. An engine shutdown valve as in claim 8 and further comprising means for moving said gate from said second position to said first position against the bias of said first spring.

10. An engine shutdown valve as in claim 9 wherein said gate moving means is an operating shaft rotatable about said axis of said gate and mounted in said one housing assembly, said gate and said drive being fixedly mounted on said operating shaft so as to be movable with said gate.

* * * * *

UNITED STATES PATENT AND TRADEMARK OFFICE
CERTIFICATE OF CORRECTION

PATENT NO. : 5,203,536     Page 1 of 4
DATED     : April 20, 1993
INVENTOR(S) : Krepela, Joseph It is certified that error appears in the above-identified patent and that said Letters Patent is hereby corrected as shown below:

The title page showing the illustrative figure should be deleted to be replaced with the attached page.

Sheet 1 of the drawings consisting of Figs. 1 and 2, should be deleted to be replaced with sheets 1 and 2, consisting of Figs. 1 and 2, as shown on the attached pages.

Signed and Sealed this

Eleventh Day of January, 1994

Attest:

BRUCE LEHMAN

Attesting Officer    Commissioner of Patents and Trademarks

United States Patent [19]

Krepela

[11] Patent Number: 5,203,536
[45] Date of Patent: Apr. 20, 1993

[54] COMPACT ENGINE SHUTDOWN VALVE

[75] Inventor: Joseph Krepela, Edmonton, Canada

[73] Assignee: Barber Industries Ltd., Calgary, Canada

[21] Appl. No.: 846,630

[22] Filed: Mar. 5, 1992

[30] Foreign Application Priority Data

Jan. 20, 1992 [CA] Canada ............................. 2059696

[51] Int. Cl.⁵ ............................................. F16K 31/44
[52] U.S. Cl. ........................................ 251/74; 251/302; 251/367; 123/394
[58] Field of Search ................... 251/66, 74, 302, 367; 123/394

[56] References Cited

U.S. PATENT DOCUMENTS

| | | | |
|---|---|---|---|
| 4,215,845 | 8/1980 | Sturgeon | 251/63 |
| 4,285,494 | 8/1981 | Sturgeon | 251/63 |
| 4,381,100 | 4/1983 | Schoenberg | 251/302 |
| 4,422,418 | 12/1983 | Dorn | 123/198 D |
| 4,537,386 | 8/1985 | Krepela et al. | 251/74 |

FOREIGN PATENT DOCUMENTS 759785 8/1980 U.S.S.R. ............................. 251/302

Primary Examiner—A. Michael Chambers
Attorney, Agent, or Firm—John Russell Uren

[57] ABSTRACT

An engine shutdown valve comprises a housing and a gate movable within a housing between a first position where the air flow through the shutdown valve is substantially unrestricted to a second position where the opening is restricted thereby stopping air flow. The gate is pivotable about an axis and a drive is located concentrically about the axis to rotate with the gate. The drive has a recess which is engageable by a piston movable between a first position where the gate is held in its latched position and a second position out of engagement with the recess so as to allow the gate to move to a position where the air passageway is closed. The piston assembly is located substantially wholly within the housing with only the piston of the piston assembly extending therefrom. The housing is divided into two halves joined together with cap screws having axes transverse to the axis of rotation of the gate.

10 Claims, 1 Drawing Sheet